(12) United States Patent
Abel

(10) Patent No.: US 6,715,775 B2
(45) Date of Patent: Apr. 6, 2004

(54) FORWARD DUMPING TWO-WHEELED BARROW

(76) Inventor: Gary V. Abel, 3882 Whitebrook La., Ellicott City, MD (US) 21042

( * ) Notice: Subject to any disclaimer, the term of this patent is extended or adjusted under 35 U.S.C. 154(b) by 118 days.

(21) Appl. No.: 09/808,903

(22) Filed: Mar. 15, 2001

(65) Prior Publication Data

US 2002/0130491 A1 Sep. 19, 2002

(51) Int. Cl.$^7$ ................................................ B62B 1/18
(52) U.S. Cl. ................ 280/47.31; 280/653; 280/47.33; 298/2
(58) Field of Search ................ 280/653, 654, 280/655, 47.26, 47.31, 47.33, 659; 298/2, 3; D34/16; 180/19.1, 19.2, 19.3

(56) References Cited

U.S. PATENT DOCUMENTS

| | | | | | |
|---|---|---|---|---|---|
| 469,614 | A | * | 2/1892 | Ward III | 280/47.26 |
| 1,338,144 | A | * | 4/1920 | McNeill | 280/47.26 X |
| 1,475,785 | A | * | 11/1923 | Bergstrom | 280/653 |
| 1,495,477 | A | * | 5/1924 | Gammeter | 280/47.26 |
| 2,308,045 | A | * | 1/1943 | Budwig | 280/47.33 X |
| D145,139 | S | * | 7/1946 | Loweree | D34/16 |
| 2,579,077 | A | * | 12/1951 | Hubner | 280/47.33 X |
| 2,589,325 | A | * | 3/1952 | Bachman | 280/47.33 X |
| 2,636,747 | A | * | 4/1953 | Blackmond | 280/47.33 X |
| D183,179 | S | * | 7/1958 | Pasin | D34/16 |
| 3,690,692 | A | * | 9/1972 | Florian et al. | 280/654 |
| 3,950,004 | A | * | 4/1976 | Olsson | 280/47.18 |
| 4,261,596 | A | * | 4/1981 | Douglas | 280/47.33 X |
| 4,632,461 | A | * | 12/1986 | Randolph | 298/2 |
| 4,861,057 | A | * | 8/1989 | Kunkle | 280/47.131 |
| 5,149,116 | A | * | 9/1992 | Donze et al. | 280/47.26 |
| 5,489,000 | A | * | 2/1996 | Hillbohm | 180/19.1 |
| 6,193,319 | B1 | * | 2/2001 | Kielinski | 298/2 |

* cited by examiner

Primary Examiner—Bryan Fischmann
(74) Attorney, Agent, or Firm—Law Offices of Royal W. Craig

(57) ABSTRACT

A forward dumping, two-wheeled barrow possessing the means to prevent inadvertent rearward dumping and/or injury to the operator is herein disclosed. The primary subassemblies of the forward dumping, two-wheeled barrow include a frame assembly, a wheel assembly, and the cargo receptacle. The frame assembly preferably includes an adjustable length handle assembly and a safety/spill prevention bracket located somewhere between the wheels and the end of the handle assembly. This novel feature prevents potential injury to the operator or nearby individuals (e.g. to the feet) and avoids the problem of emptying all or some of the receptacle's contents in an unintended location. In addition, the safety bracket provides a stable rearward loading position with minimal risk of tipping and/or rolling. The ergonomically designed barrow is fabricated of a variety of strong, lightweight materials (e.g. aluminum, reinforced plastics) to provide a high-strength-to-weight ratio.

2 Claims, 5 Drawing Sheets

FORWARD DUMPING TWO-WHEELED BARROW

BACKGROUND OF THE INVENTION

1. Field of the Invention

The present invention relates to multi-wheeled barrows and, more particularly, to an improved, forward dumping design possessing a safety feature to prevent inadvertent rearward dumping and/or injury to the operator.

2. Description of the Background

Single- and multi-wheeled barrows represent some of mankind's earliest wheeled vehicles and are, therefore, well known. The predominant design of such barrows possesses rearwardly extending handlebars, a single wheel positioned toward the front of the barrow, and two rear-mounted, vertical legs on which the barrow rests/balances when not in motion. Motion occurs when an operator, standing behind the barrow between the handlebars, lifts the rear portion by means of said handlebars and pushes/pulls the barrow. Variations on this basic design are found in U.S. Pat. Nos. 4,052,079 to Lehman, 4,789,171 to Porter, and 5,149,116 to Donze et al. While one advantage of this design is the ability to dump the barrow's contents forward or to either side, the fact that the operator must hold the handlebars in a raised position while walking forward/backward is problematic. When heavy loads are involved, the act of lifting and holding the legs off of the ground while moving the barrow subjects the operator to various forms of injury.

Alternative designs typically place two wheels toward the back end of the barrow or, in other words, at a point located behind the leg(s) or surface(s) utilized to balance the barrow when stationary. An operator moves (i.e. pushes/pulls) a barrow of this type by exerting downward force on the rearwardly extending handle assembly in order to raise the balancing leg(s)/surface(s) off of the ground. The barrow is emptied by tilting or pivoting it forward to discharge the cargo over the front lip or leading edge. Examples of this concept are found in U.S. Pat. Nos. 3,888,501 to McChesney, 4,629,203 to Ballard, and 6,193,319 to Kielinski.

This "rear wheel" design is superior because, unlike "front-wheel" barrows the operator does not have to lift a significant percentage of the total weight of the barrow and cargo (unless, as in U.S. Pat. No. 5,149,116, a counterweight is included in front of the wheel(s)—thereby adding substantially to the overall weight of the barrow). This is because the center of the entire barrow/cargo combination can be located almost directly over the wheels. The leverage resulting from the ratio of (1) the effective length of the handle assembly (i.e. the horizontal distance from the centerline of the wheels to the end of the handle assembly; to (2) the minimal horizontal distance, or moment arm, between the center of gravity of the entire barrow/cargo combination and the centerline of the wheels, means that a relatively small amount of downward force is needed to lift the legs off of the ground regardless of the weight of the cargo.

Unfortunately, as the wheels are shifted rearward the barrow becomes more susceptible to tipping over rearwardly. An unexpected, or inadvertent, rearward tipping of the barrow may result in either the spilling/dumping of some or all of the cargo contained therein, or an injury to the operator, or some other nearby individual, due to being hit by, or trapped under, the handle assembly. Therefore, there exists a need for a forward dumping, two-wheeled barrow designed to prevent inadvertent rearward spilling/dumping of cargo and/or injury to the operator or nearby individuals.

SUMMARY OF THE INVENTION

It is, therefore, the primary object of the present invention to provide an improved configuration for a forward dumping, two-wheeled barrow that possesses the means to prevent inadvertent rearward dumping and/or injury to the operator.

It is still another object to provide an improved configuration for a forward dumping, two-wheeled barrow that possesses a simple, lightweight, ergonomically-correct design with a high strength-to-weight ratio.

It is still another object to provide a forward dumping, two-wheeled barrow with a stable "loading" position by which contents may be safely loaded and unloaded without risk of tipping.

In accordance with the above objects, one embodiment of an improved configuration is a barrow that possesses a safety/spill prevention bracket located somewhere between the wheels and the end of the handle assembly. This novel feature prevents potential injury to the operator or nearby individuals (e.g. to the feet and to the hands) and avoids the problem of emptying all or some of the receptacle's contents in an unintended location. A brief description of the forward dumping, two-wheeled barrow according to the present invention is as follows. The ergonomically designed barrow is fabricated of a variety of strong, lightweight materials (e.g. aluminum, reinforced plastics) to provide a high-strength-to-weight ratio. The three main subassemblies of the present invention include a frame assembly, a wheel assembly, and the cargo receptacle. The frame assembly preferably includes an adjustable length handle assembly.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
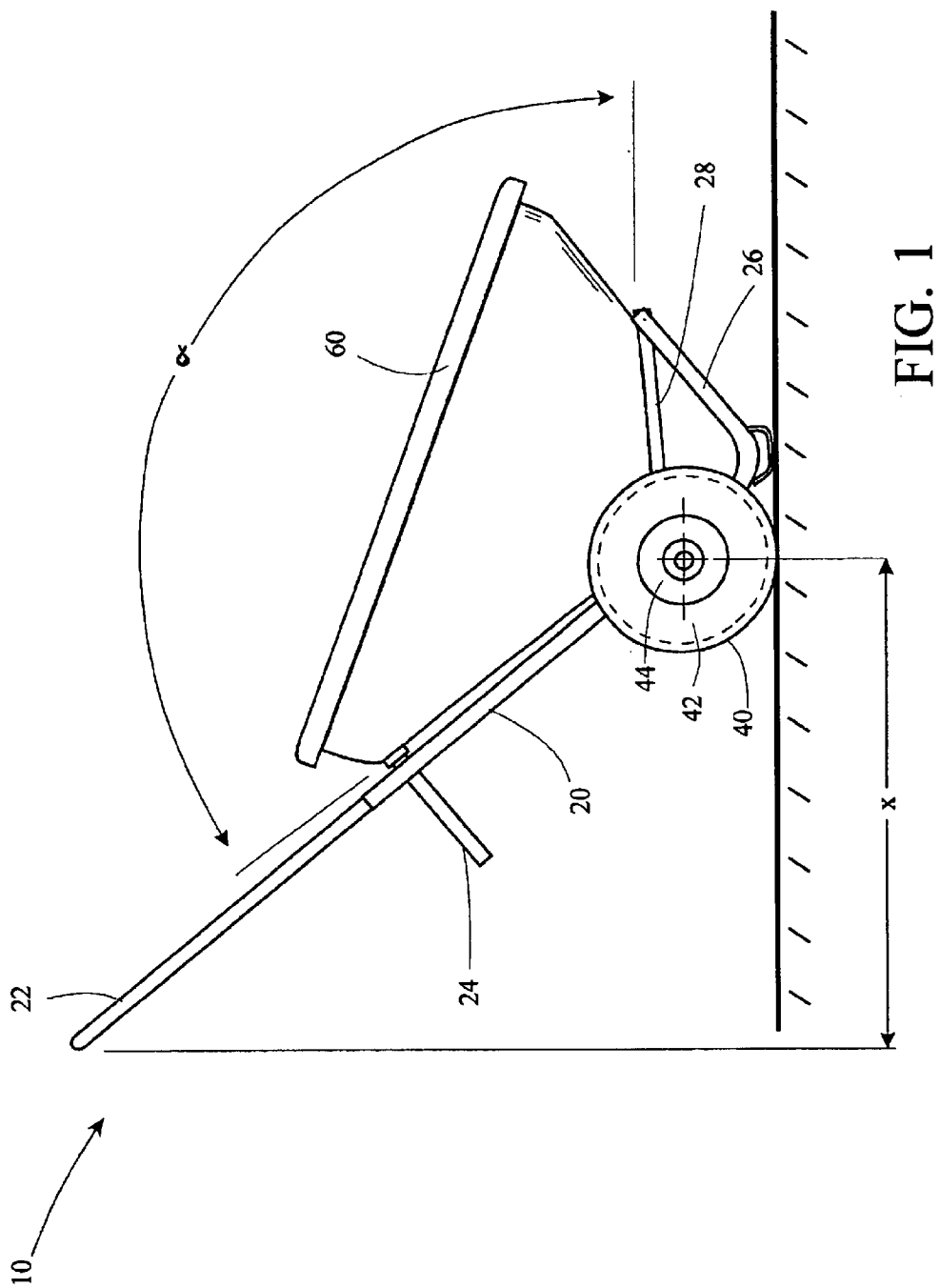
FIG. 1 is a side elevation view of a forward dumping, two-wheeled barrow 10 according to a first embodiment of the present invention.
Figure 2:
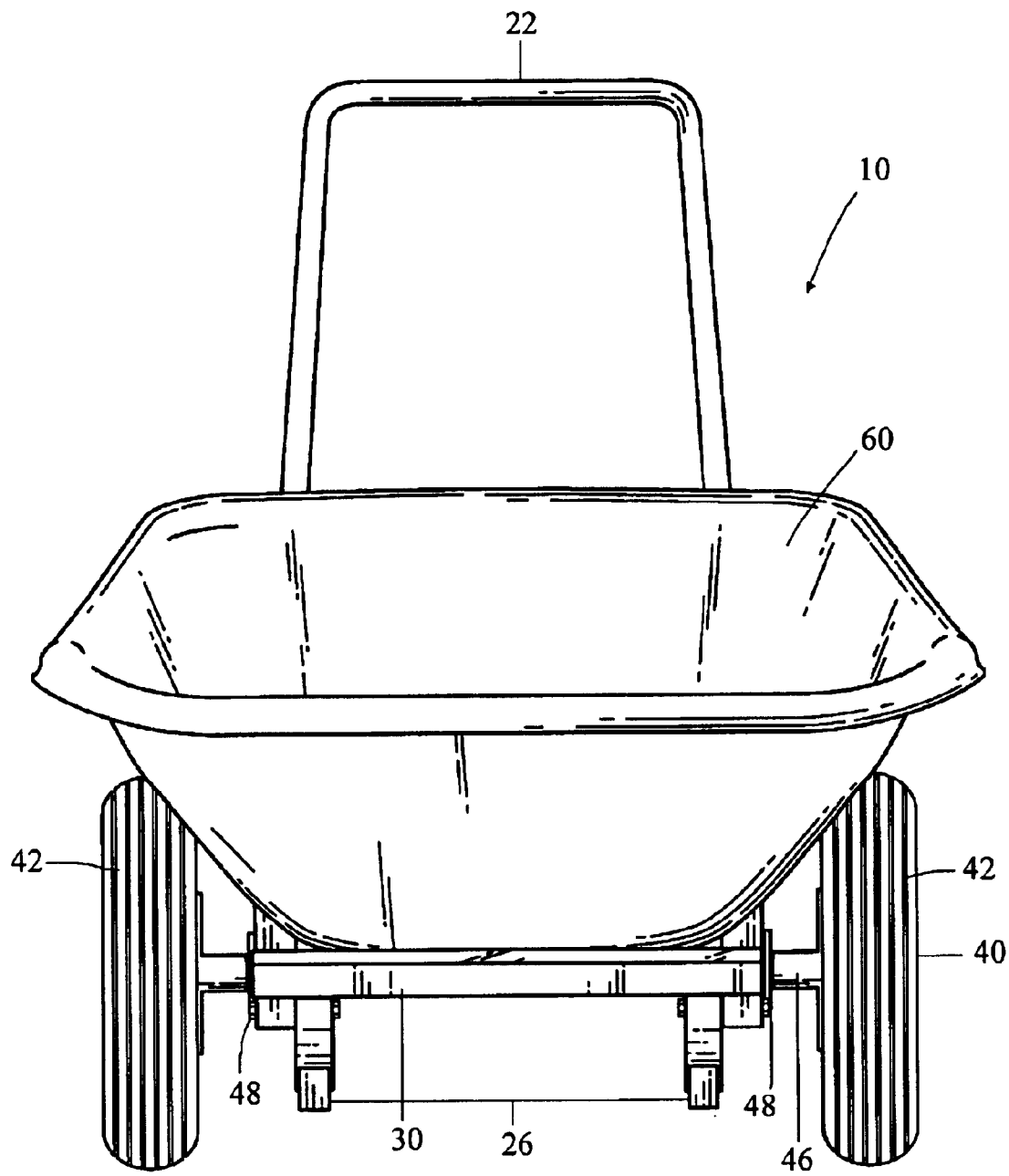
FIG. 2 is a front perspective view of a forward dumping, two-wheeled barrow 10 according to a first embodiment of the present invention.
Figure 3:
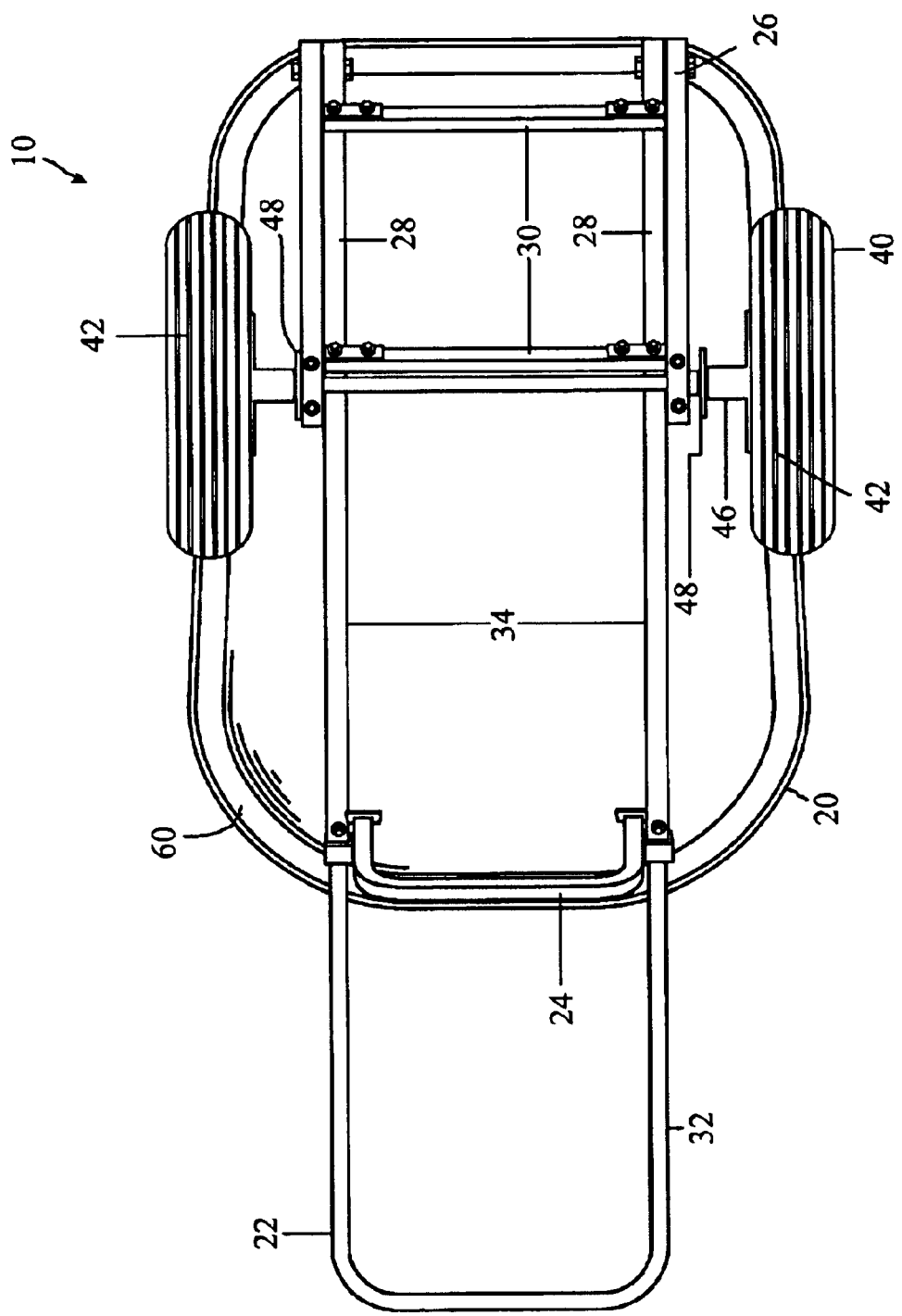
FIG. 3 is a bottom view of a forward dumping, two-wheeled barrow 10 according to a first embodiment of the present invention.

FIGS. 1, 2, and 3 show, respectively, side elevation, front perspective, and bottom views of a forward dumping, two-wheeled barrow according to a first embodiment of the present invention. The three main subassemblies of the present invention include a frame assembly 20, a wheel assembly 40, and the cargo receptacle 60.

The frame assembly 20 is preferably constructed of strong, lightweight materials such as aluminum steel tubing or reinforced plastic. The frame assembly 20 consists of a handle assembly 22, a safety/spill prevention assembly 24, two balancing legs 26, and cargo receptacle support brackets 28, 30. The handle assembly 22 and the support brackets 28 are joined at an angle (shown as "α" in FIG. 1) equivalent to that molded into the bottom of the plastic cargo receptacle 60. The support brackets 30 are bolted at right angles to the support brackets 28. The receptacle 60 is bolted to both the lower section of the handle assembly 22 and the support brackets 28, 30 with the rectangle formed by the brackets 28, 30 constituting the primary load bearing frame members. The safety/spill prevention assembly 24 includes a bracket that is bolted or welded to the handle assembly 22 at points proximate the receptacle's rear, upper lip or edge. The balancing legs 26 are attached to the outside surfaces of the support brackets 28.

The wheel assembly 40 consists of two solid, pneumatic or semi-pneumatic rubber wheels 42 with lightweight metal or plastic hubs 44, a metal axle 46, and two bearings 48. The wheels 42 are mounted on the hubs 44 which are, in turn, attached to the two ends of the the axle 46. The axle passes through and is supported, in a freely rotating manner, by the bearings 48. The bearings 48 are attached to the frame assembly 20 at points near the union of the handle assembly 22 and the support brackets 28.

As stated above, the cargo receptacle 60 is preferably a molded plastic component. The receptacle 60 can be molded in a variety of sizes/capacities depending upon the ultimate, intended use for the barrow 10. Preferably, the cargo receptacle 60 is molded with a substantially triangular bottom trough having an inverted apex pointing directly at the axle. This configuration provides a uniform and balanced fulcrum about the axle and minimizes spillage.

Figure 4:
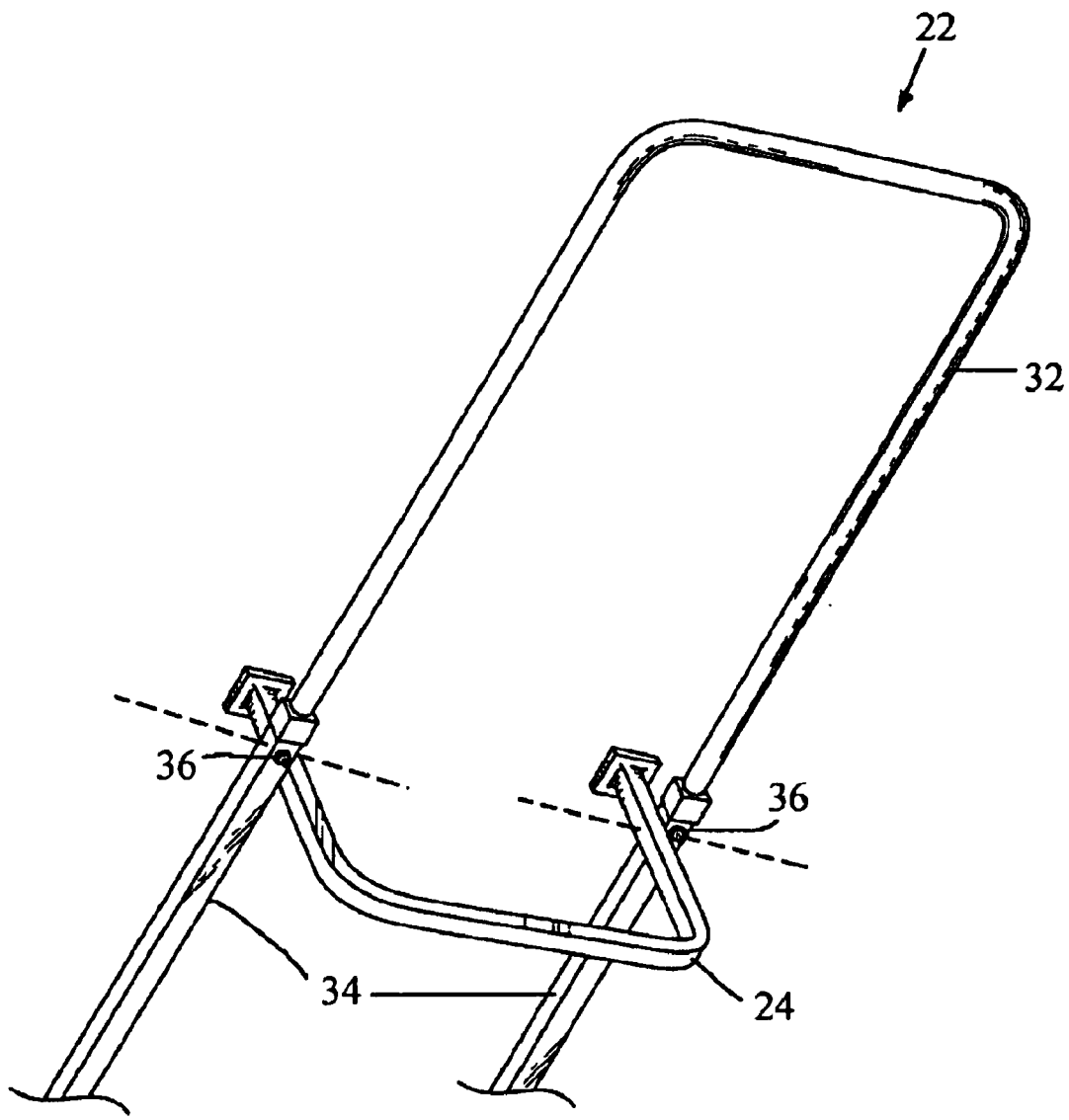
FIG. 4 is a perspective view of the handle assembly 22 and safety/spill prevention assembly 24 of the forward dumping, two-wheeled barrow according to a first embodiment of the present invention.

FIG. 4 shows the handle assembly 22 and the safety/spill prevention assembly 24 of the present invention. The handle assembly's top end 32 is shaped like an inverted "U" and there exists a telescoping connection between it and the handle assembly's lower sections 34. Adjustment of the handle assembly's length to ergonomically accommodate different operators is accomplished by (1) loosening two bolts 36, (2) sliding the top end 32 in or out of the lower sections 34 until the desired length is reached, and (3) tightening the two bolts 36 to maintain the relative position of the top end 32 and the lower sections 34. Adjustment of the handle assembly's length either increases or decreases the horizontal distance from the centerline of the wheel assembly 40 to the end of the handle assembly 22 (dimension "x" of FIG. 1) and, therefore, either increases or decreases the amount of leverage available to the operator in moving the cargo held in receptacle 60. It should be noted that push-pins, cotter pins or spring-bottoms can be readily substituted for the bolts 36 as a matter of design choice.

Figure 5:
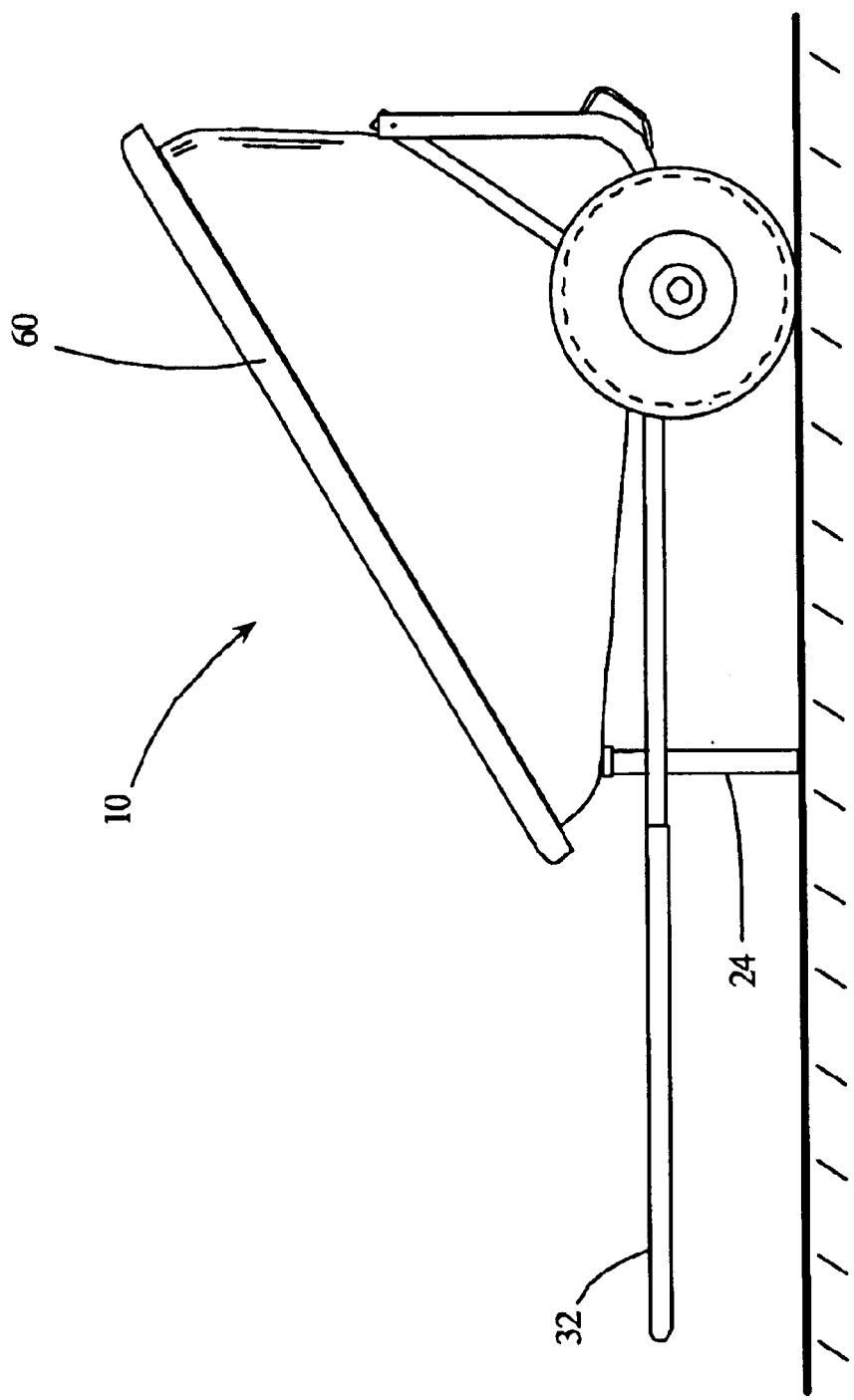
FIG. 5 is a side elevation view of a forward dumping, two-wheeled barrow 10, shown resting on the safety/spill prevention assembly 24, according to a first embodiment of the present invention. This Figure illustrates the stable rearward "loading" position by which contents may be safely loaded and unloaded with minimal risk of tipping.

FIG. 5 shows a forward dumping, two-wheeled barrow 10 according to a first embodiment of the present invention resting on the safety/spill prevention assembly 24. If the safety/spill prevention assembly 24 and the cargo receptacle 60 are designed appropriately, in any circumstances where the barrow 10 inadvertently tips rearward, it comes to rest on the assembly 24 before either the handle assembly's top end 32 strikes the ground or the cargo begins to spill out of the receptacle 60. In this regard, the protruding extent of the safety/spill prevention assembly 24 is calculated with respect to the angle and dimensions of the cargo receptacle 60 and the diameter of the wheels 40 such that it is sufficient to prevent the distal end of the handle assembly 22 from contacting the ground if the barrow 10 inadvertently tips rearwardly. This novel feature prevents potential injury to the operator (especially the hands and feet) and/or nearby individuals and avoids the problem of emptying all or some of the receptacle's contents in an unintended location. This novel feature also provides a stable rearward "loading" position as seen in FIG. 5 by which contents may be safely loaded and unloaded with minimal risk of tipping. Specifically, when shoveling material into or out from the barrow 10 there might otherwise be a tendency to become unstable on an inclined surface and to roll or slide, either way causing a safety hazard. This is because the present configuration balances the majority of the weight directly over the axle with minimal weight over the balancing legs 26. With all the weight on the wheels there is a much greater tendency to roll or slide. By reclining the barrow 10 so that it rests squarely on the safety/spill prevention assembly 24, the operator enjoys a stable rearward loading position as shown by which contents may be safely loaded and unloaded with minimal risk of tipping and/or rolling.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A two-wheeled barrow, comprising:

a rigid frame assembly;

two surface-contacting balancing legs at one end of said frame assembly;

two bearings mounted on said frame assembly and spaced from the balancing legs;

a freely rotating axle passing through both of the bearings;

two wheel and hub assemblies attached to the ends of said axle;

a cargo receptacle mounted on said frame assembly, said cargo receptacle being formed with a substantially triangular bottom trough having an inverted apex pointing toward the axle to provide a uniform and balanced fulcrum about the axle, said triangular bottom running to an upper edge;

a handle assembly attached at another end of said frame assembly and extending parallel along one side of the triangular bottom of said cargo receptacle; and, a safety bracket attached perpendicularly to the handle assembly at points on the handle assembly that is proximate the upper edge of said cargo receptacle, said safety bracket extending outward away from said cargo receptacle, said safety bracket being a predetermined length sufficient to prevent said handle assembly from contacting the ground if said two-wheeled barrow tips rearwardly.

2. The two-wheeled barrow according to claim 1, wherein said safety bracket is attached perpendicularly to the handle assembly, extends outward by sufficient length and is spaced along said handle a sufficient distance from said wheel and hub assemblies to share the weight of a load with said wheel and hub assemblies when said barrow rests on said safety bracket, thereby providing a stable rearward loading position with minimal risk of tipping and/or rolling.

* * * * *